United States Patent [19]

Showalter

[11] Patent Number: 4,668,107
[45] Date of Patent: May 26, 1987

[54] ENGINE BEARINGS

[75] Inventor: Merle R. Showalter, Madison, Wis.

[73] Assignee: Automotive Engine Associates, Madison, Wis.

[21] Appl. No.: 765,399

[22] Filed: Aug. 14, 1985

[51] Int. Cl.⁴ .................. F16C 32/06; F16C 33/10
[52] U.S. Cl. .................................. 384/114; 384/288
[58] Field of Search ................. 384/99, 100, 114–120, 384/276, 282, 286, 288, 294, 152; 74/594

[56] References Cited

U.S. PATENT DOCUMENTS

| | | | |
|---|---|---|---|
| 3,201,183 | 8/1965 | Buske | 384/286 |
| 3,311,428 | 3/1967 | Scheufler | 384/286 |
| 3,449,028 | 6/1969 | De Hart | 384/288 X |
| 3,625,580 | 12/1971 | De Hart et al. | 384/288 |
| 3,843,216 | 10/1974 | Campbell | 384/152 |
| 4,311,349 | 1/1982 | Roberts | 384/288 |

FOREIGN PATENT DOCUMENTS 74676  3/1983  European Pat. Off. ............ 384/294

Primary Examiner—Stuart S. Levy
Assistant Examiner—Thomas R. Hannon
Attorney, Agent, or Firm—Witherspoon & Hargest

[57] ABSTRACT

A hydrodynamic journal bearing including a rotary journal shaft which is circular in cross section, a journal bearing surrounding the journal shaft and having at least two arcuate bearing surfaces, each arcuate surface defined by a radius slightly greater than that of the journal shaft so that the journal shaft will be in lubricated contact with at least the mid portion of each arcuate bearing surface while the ends of each arcuate bearing will be spaced from the surface of the rotary journal shaft, and seals to assure that lubrication almost completely fills all spaces between the rotary journal shaft surface and that of the journal bearing surface.

8 Claims, 14 Drawing Figures

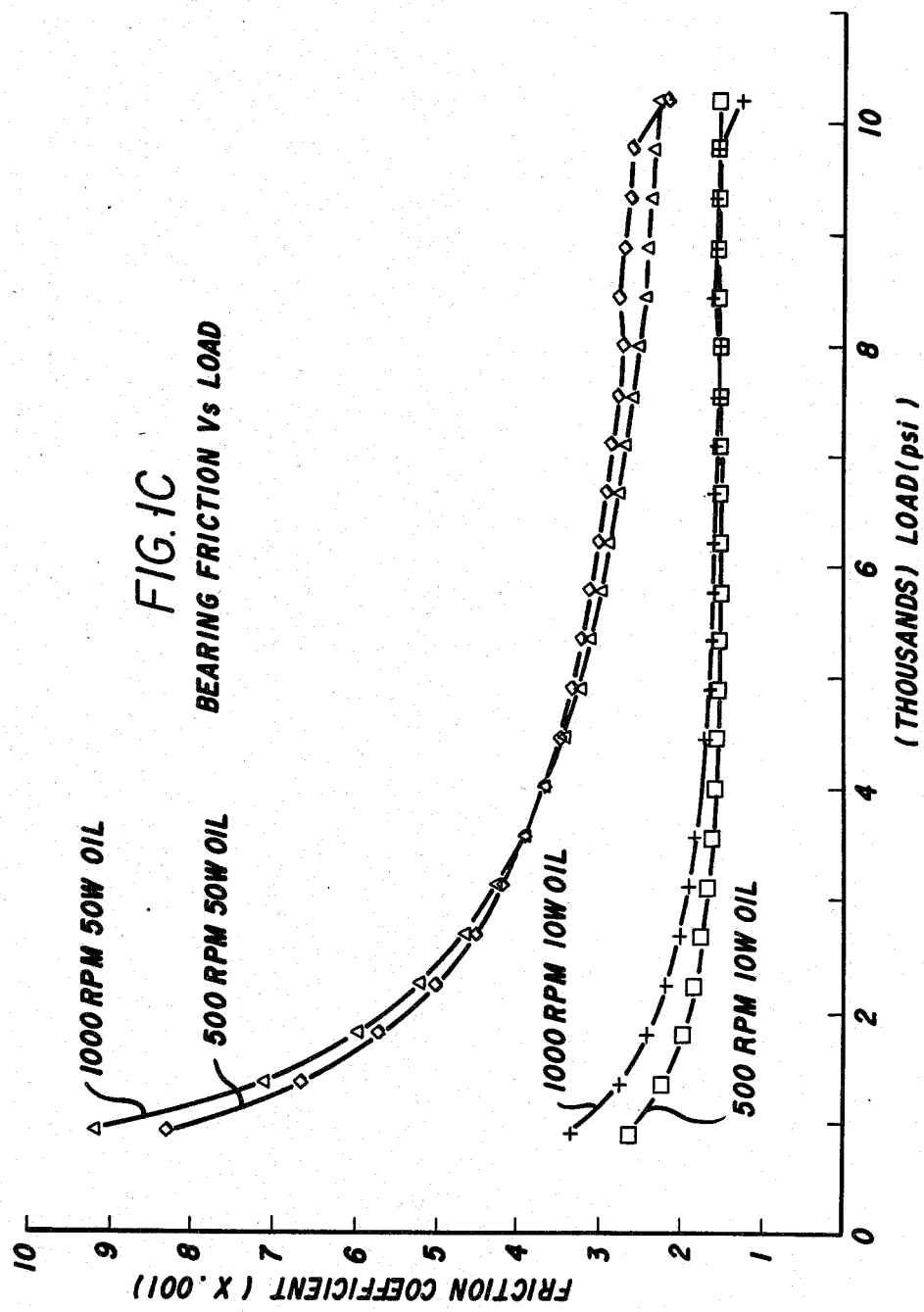

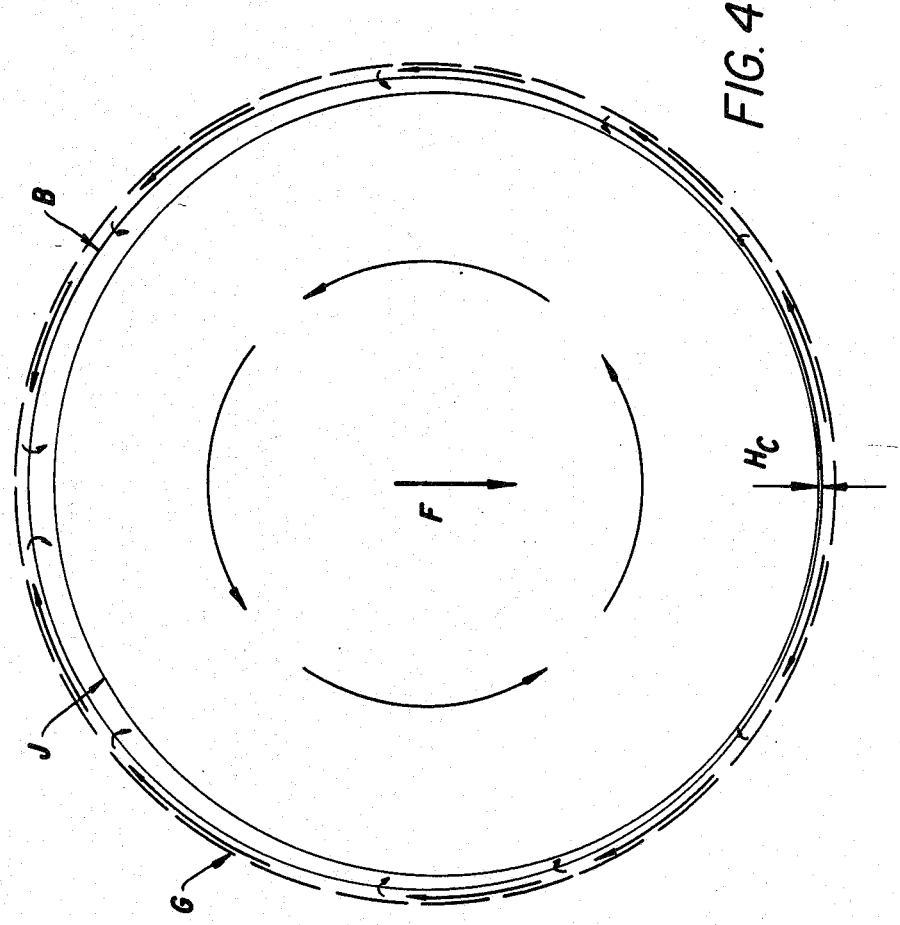

ENGINE BEARINGS

BACKGROUND AND OBJECTS

It is the purpose of the present invention to radically increase the load-bearing capacity and durability of journal bearings for reciprocating machinery, particularly gasoline and diesel engines, and at the same time reduce bearing friction loss.

Engine main and connecting rod bearings have been design-limiting and a source of engineering concern since the early days of engines. Significant efforts have been made to improve engine oils and bearing materials to tolerate the marginal lubrication conditions under which engine bearings operate. This work is costly and at best treats only the symptoms of the bearing design problem. Several billion dollars worth of petroleum per year is wasted by excess friction loss in engine bearings which perform well below their theoretical limits.

Although engine oils have been greatly improved, the limits of engine bearing load capacity and friction characteristics have not been conspicuously improved since World War II. In World War II men frequently died in air combat because their engine power was not as great as it needed to be for them to outmaneuver their enemy. Airplanes were often lost from bearing failures due to combat overloads. For this reason, the large number of excellent mechanical engineers, then working to continuously improve combat engine performance, were under intense pressure to increase main and connecting rod journal bearing performance, and they did so. The structural, hydrodynamic, and material compatibility characteristics of bearings received more intense scrutiny than they have since. Nonetheless, bearings continued to significantly limit engine performance until the end of the war, and continue to do so.

Well before World War II, experience had formed an engineering consensus that powertrain journal bearings would operate under such severe conditions that surface rubbing contact between bearings and journal was inevitable; therefore, research and development has focused on the boundary lubrication characteristics of lubricants, the ability of bearing materials to run against the crankshaft journal without welding or scoring, the corrosion resistance and fatigue strength of bearing materials, and manufacturing techniques to conserve the somewhat costly bearing materials used. Boundary lubrication is a very difficult field and theoretical predictions are not very trustworthy. The development of bearings and lubricants has therefore been largely empirical, with the empirical work guided by very sophisticated knowledge of the molecular-level physical and chemical characteristics of boundary lubrication.

The current excellent maintenance record of engine bearings is due to precise knowledge of bearing limitations and design of machines within these limitations. When these limitations are pushed, for example in racing engines, bearings fail. Bearing limitations are also the most basic limit on peak cylinder pressures in diesel engines (although current cylinder head sealing would have to be improved to take advantage of increased bearing load capacity). Significant fuel economy and power improvements would be possible if these peak pressures could be increased.

An interesting contrast to the connecting rod big end bearing, which has long been a source of engineering attention, is the wrist pin bearing joining the connecting rod to the piston. These bearings almost never fail, and have been essentially trouble-free throughout the history of engine development. They typically operate at pressure loads twice that of the big end journal bearings, and their wear characteristics indicate that they almost always operate in a full oil film condition without surface contact. For instance, steel on steel rubbing contact in boundary lubrication very often leads to contact welding and bearing seizure, but steel wrist pins bear directly on steel surfaces in the connecting rods of production engines without difficulties. The wrist pin bearing's full oil film performance is at first sight the more surprising because of its low sliding speed. Sliding speed acts to build up a hydrodynamic oil film. It is an interesting commentary on the connection between the generally empirical tradition of engine design and the mathematical and physical tradition of lubrication that wrist pins in steam and automotive engines took loads much higher than predicted by the theory for about 100 years until Professor Dudley D. Fuller of Columbia University explained their function by the squeeze film effect in the 1950's.

Under the present invention load capacity and film stability similar to that already shown by wrist pin bearings and much lower bearing friction loss than current levels is obtained with simple part geometry. Data and theory both indicate that it should be possible to build connecting rod bearings and main bearings which are essentially trouble-free and operate with low friction loss at the highest loadings to which engine structures can plausibly be built - peak bearing loadings in excess of 20,000 lbs/in$^2$ of bearing projected area. Similar designs should be applicable to forging presses and other very highly loaded bearing applications at full film bearing loads approaching or exceeding 40,000 psi. This is radically better bearing performance than has existed in the past.

To achieve this greatly enhanced load-bearing capacity and to reduce friction requires that two things be done simultaneously. First, the difference in radii of curvature (mismatch) of the rotating journal and the bearing surface must be sufficiently large (very much larger than conventional practice) so that the parts, in mechanical interaction with the oil film under load deform in a manner so that the system produces proper relative geometric characteristics. The important geometric relationships between bearing and journal must exist under load rather than in the static condition. Recognition of the interaction between elastic deformation and the hydrodynamic fluid mechanics in the bearing results in radically different tolerancing of the relatively sliding bearing surfaces than common practice. For the invention it is typically necessary to arrange the geometry so that at least two arcs of the bearing circumference have different centers of curvature to make the large radius of curvature differences between journal and bearing required, without excessive mechanical freedom of the bearing with respect to the journal. The differences in center of curvature typically produce a very beneficial effect of smoothly closing voids in the oil film caused by cavitation, prior to the oil film entering the heavily loaded high pressure arc of the bearing. Second, it is necessary to arrange sealing means, which could be accomplished by an O-ring arrangement or by relatively tight axial clearances between journal and bearing at the side, so that the bearing stays full of oil and does not allow the fluctuating forces and displacements of bearing operation to pump the bearing dry.

Restricting the exit of oil from the bearing so that the bearing operates full of oil produces much thicker and more stable oil films than current practice and essentially eliminates the boundary lubrication problems which have plagued conventional journal bearings in reciprocating load applications.

The current invention exists in such a crowded art that it is important to explain why the invention was not obvious in view of the prior art. The basic reasons for this have to do with an improved understanding of bearing function in the presence of unavoidable structural deflections of the sliding parts under load. In terms of the prior understanding of proper journal bearing design, the bearing of the present invention is designed wrong. However, this "wrong" design functions much better than previously accepted designs.

The body of accepted design practice from which the present invention departs is massive. In many ways, the best explanatory reference to the lubrication arts in the English language is Dudley D. Fuller's *Theory and Practice of Lubrication for Engineers*, Second Edition, John Wiley & Sons, New York, 1984, which will be cited in a number of places in this application. On pages 262 and 263 of that reference, Fuller states:

"... there have been few attempts to digest the great mass of technical literature available on journal bearing design and performance and systematize it for the use of the practicing engineer. Certainly, as a busy man, he does not have the time to do this for himself. For example, on journal bearings alone the American Society of Lubrication Engineers has prepared an annotated bibliography of 563 references with an overall appraisal of their value. They were selected from some 2500 publications through the year 1954. Since then, perhaps another thousand or more papers and books have ben added to the literature. To assemble—in some cases, translate—read, and organize this material would be an impossibility for the busy practicing engineer."

The most basic point of departure of journal bearing analysis is that of A. Sommerfeld, who in 1904 derived the dimensionless group $$S = \left(\frac{R}{c}\right)^2 \frac{\mu N}{P},$$

called the Sommerfeld variable. In the equation, R is the journal radius, c is the difference in radius of curvature between the journal cylindrical surface and the cylindrical surface of the bearing, $\mu$ is viscosity of the lubricant; N is shaft speed in revolutions per second; and P is the force per unit projected area (force divided by journal radius times journal axial length). In another very good and basic reference in lubrication, *Standard Handbook of Lubrication Engineering*, James J. O'Connor, and John Boyd, editors, McGraw Hill Book Company, 1968, the conventional wisdom concerning the Sommerfeld variable is stated on pages 5-40 of Chapter 5, written by Raimondi, Boyd and Kaufman.

"The charts show the performance variables as functions of the bearing characteristic number or Sommerfeld number, S, where $$S = \left(\frac{R}{c}\right)^2 \frac{\mu N}{P}.$$

This number united in one dimensionless variable most of the factors (only the bearing arc $\beta$ and L/D ratio are omitted) over which the designer has direct control. Its major importance lies in the fact that, once this number has been established, all the operating characteristics (of the bearing) become fixed."

The journal bearing charts plot bearing performance in terms of the Sommerfeld variable on pages 5-41-44 and 5-49, 5-52, 5-53, 5-54, 5-55 of the *Standard Handbook*. Almost all journal bearing analysis is based on the mathematical work of Sommerfeld.

A major key to the present invention lies in the recognition that the Sommerfeld variable, as it is conventionally interpreted, is systematically misleading in bearing design and that an understanding of the real physical situation permits great improvements in practical bearing performance. This recognition is not obvious, or bearing problems which have persisted for many years would have been eliminated long ago.

The recognition did not come easily to the inventor, who has for years attempted to improve practical bearing performance. Specifically, the inventor worked and thought intensely about the problem of improving load capacity in bearings and, through a systematic misunderstanding of the problem, developed very high load-bearing capacity pivoted pad bearings and journal bearings set forth in the co-pending applications (Ser. No. 502,468 Hydrostatically Supported Pivoted Pad Slider Bearing with Very High Load-Bearing Capacity, Ser. No. 502,581 Connecting Rod, Ser. No. 502,572 Superposition of Pivoted Pad Slider Bearing and Squeeze Film Fluid Mechanics for Heavily Cyclically Loaded Machine Elements all now abandoned). The inventor's company spent several hundred thousand dollars developing these bearing concepts. It was experimental problems and results from this work which led to the current invention.

To understand the present invention, it is important to have a sense of the scale on which the crucial geometric relations govern the performance of hydrodynamic bearings. These distances and angles are not directly accessible to human senses, yet they are vital. Fuller makes the point vividly on page 209 of the previously cited work in reference to another hydrodynamic geometry, but the point is equally valid for journal bearings.

"Typical schematic drawings of tapered lands or of pivoted pads can be very misleading. The slope for good load-carrying capacity is only about 0.003 in./ft, or approximately one unit in 4000 units. Thus, for example, if a bearing pad were as long as a football field (100 yd or 91.47 m), the proper elevation of one end over the other, for good hydrodynamic load-carrying capacity, would be about 0.9 in. (2.28 cm)!"

For heavily loaded journal bearings, the convergence angle between the sliding surfaces in the portion of the bearing of most physical importance may be much less than the 0.003 in/ft cited by Fuller—as little as 0.0003 in/ft or less. It is hard to think about building real hardware to function with geometric relations as fine scale as this.

In addition to the problem of fine scales, the basic equation of hydrodynamic lubrication, Reynolds' equation, is somewhat difficult to manipulate and think about, even for professionals. Virtually all mathematical analyses involve simplifying mathematical assumptions, and these simplified assumptions may make an analysis invalid or misleading. Particularly, all journal bearing analyses of which the inventor is aware assume an infinitely stiff bearing structure—a radically misleading assumption in most bearings, since even very tiny deflections can be significant on the scale at which hydrodynamic fluid mechanics happens. Conventional analysis is done with the assumption that the lubricant (if it is a liquid) is incompressible. This analysis becomes radically incorrect if the oil contains any significant concentration of bubbles, even tiny ones.

Deformation

Incorporating the idea of bearing deflection when considering automotive powertrain bearing performance presents a complex conceptual problem. The theory of elastic deflections, stresses and strains of real parts in the presence of real forces is well worked out and extremely satisfactory in the mathematical sense, but the theory is difficult and laborious to apply to particular cases. Except for using handbooks, few engineers manipulate these equations at all and only a few specialists in engineering organizations manipulate them routinely. The tradition in mechanical engineering is to consider stresses and strains only when they are high enough that component failure is an issue, except under special circumstances. The importance of structural deflections to film formation in engine bearings has not been appreciated. If certain readily available analytical deflection analysis had been applied to engine bearings by a bearing engineer who understood the significance of what he was doing, the present invention could have occurred sixty years ago.

A problem with the fine scale issues relevant to journal bearings is that practicing engineers are reluctant to think about analytical results which analyze geometric scales much finer than the accuracy to which they can fabricate parts. In production and normal shop practice, it is hard to hold machining tolerances closer than 0.001"; tolerances to 0.0001" are much more difficult; and tolerances closer than 0.0001" can only be held under very special circumstances. The deflection scales and film thicknesses relevant to engine powertrain bearings are often finer than this. The normal reaction is to consider analytical results concerning these very fine scales "impractical." However, in the case of bearing design, issues on these scales are real and practically important.

It has long been known that deflections occur when two relatively curved surfaces come together. For instance, if a mathematically perfect cylinder comes into contact with a mathematically perfect plane with zero deflection, the contact point would be a mathematically perfect line with zero area. If any force occurred between the cylinder and the plane with zero deflection, the force divided by the zero contact area would produce an infinite contact pressure. What happens physically for real materials (for example, steel) is that the line contact widens to an area having a width as the structure deforms. The cylinder center will also slightly approach the undeformed planar surface. The deformation caused by usual design forces is elastic and perfectly reversible leaving no permanent change in the shape of either piece after they are unloaded. In the area of contact, the two surfaces are touching and have (over areas large enough to average out roughness variations) exactly the same surface shape. Mathematically this means that the radius of curvature of the two surfaces exactly matches anywhere over the contact area and the difference in radius of curvature is zero throughout the contact area.

Calculations of contact stresses, contact widths, and surface deformations were first done by H. Hertz in a famous paper of 1884, and the results, which have been shown to be important and reliable, are clearly set out in *Formulas for Stress and Strain* by Raymond J. Roark and Warren C. Young, McGraw Hill, 1975. In that reference the case relevant to journal bearings (the case of a cylinder within a cylindrical socket) is set out as formula 2c in Table 33 on page 516.

The formulas for a cylinder on a flat plate, a cylinder in contact with a parallel cylinder, and a cylinder in a cylindrical socket are the same if an effective diameter $K_D$ is used in the formulas. For a cylinder on a flat plate, $K_D = D$, the cylinder diameter. For a cylinder inside a cylinder, $$K_D = \frac{D_1 D_2}{D_1 - D_2}$$

where $D_1$ is the diameter of the cylindrical socket and $D_2$ the diameter of the cylindrical shaft. This formula is based on an approximation which is not quite exact. The error in predicted contact width and deflection approach between a bearing shaft and a cylindrical bearing hole in a steel block so rigidly constructed that bending deflections (as opposed to unavoidable Hertzian contact deflections) are zero is less than 0.6% for a 30° arc of contact, less than 2.2% for a 60° arc of contact, and less than 6.2% for a 120° arc of contact, so that the approximation is fairly satisfactory.

Consider a 2" diameter cylindrical journal shaft (a common diameter in engine crankshafts) in a bearing of 2.002" diameter (a common engine clearance). $K_D$ is 2,000 inches (166 feet, or the height of a 16 story building). The contact area characteristics in this bearing for any load are similar to the contact situation of a flat plate of steel pushed against a steel cylinder of 166 foot diameter. By visualizing this situation it is fairly easy to understand that contact width between the huge cylinder and the flat plate (or the cylindrical journal in the cylindrical bearing hole) can be of the order of an inch. From Roark and Young, the formula for contact width for a journal in a bearing is $$b = 2.15 \sqrt{\frac{FK_D}{E}}$$

where F is the force between shaft and bearing, $K_D$ is the effective diameter, and E is the modulus of elasticity of the material [strain (fractional length change) per unit stress—for steel (about 30,000,000 psi)]. For a 2" shaft diameter, with 0.002" diametral clearance in a bearing of steel the contact area, width b in inches, and the contact arc angle vary with force F approximately as follows:

| F (lbs) | b (inches) | contact arc angle |
|---------|------------|-------------------|
| 1,000   | .56        | 32°               |
| 2,000   | .79        | 45°               |
| 5,000   | 1.24"      | 71°               |
| 10,000  | 1.75"      | 100°              |

Over these contact areas, the difference in surface radius of curvature between shaft and bearing is zero, rather than the 0.001" difference in radius of curvature for the unstressed pieces. From Roark and Young the distance which the cylindrical shaft elastically "squashes in" to the bearing can be calculated as:

| F, lbs | $\partial$ |
|--------|------------|
| 1,000  | $.92 \times 10^{-4}$ in |
| 2,000  | $1.5 \times 10^{-4}$ in |
| 5,000  | $3.0 \times 10^{-4}$ in |
| 10,000 | $4.6 \times 10^{-4}$ in |

These deflections, although they are small, are as large or larger than the minimum film thicknesses conventional journal bearing theory would predict in most practical cases where engine journal bearings operate.

The above contact deflection calculations assume bearing structure which has bending stiffness large enough that bending deflections can be ignored. An example where this would be approximately true would be a bearing hole cut in a block of steel with a depth in the direction of bearing loading of three times journal diameter and support a short distance from the shaft center in the direction perpendicular to bearing loading. No automotive bearings, and few bearings in any machine application, are supported as stiffly as this. For conventional main bearing and connecting rod bearings, the effect of bending, which adds to unavoidable Hertzian contact deflections described above, acts to reduce the force required to produce a given contact arc by a factor between two, for very heavy main bearing supports, to 100 or more for connecting rod bearing caps. Analysis of engine bearings using the assumption of infinite stiffness is radically misleading.

Considering the actual deflections in a bearing system is difficult even for a simple geometry like that of an engine main bearing cap, and the net deflection combining bending, tension, and Hertzian compression which will occur in an engine connecting rod is extremely difficult to predict. But even in the stiffest of practical cases, the deflections cause changes in geometry that dramatically affect bearing performance.

It should be pointed out that the deflections within the metal of the shaft or the bearing depend on the pressures exerted on the part surfaces. These pressures can be exerted by oil films as well as by contact between the parts. Although the pressure distribution exerted by the oil film will generally be different than the pressure distribution produced by direct surface contact, the deflections of the bearing and shaft will automatically adjust elastically to a shape which produces a minimum energy condition between the surfaces. For a very wide range of conditions, this elastic deflection will produce surface matching of curvatures between the sliding surfaces conducive to lubricant film stability on geometric scales very much finer than the precision scale to which the parts themselves are manufactured. For example, deflection can readily produce local surface matching where lubricant films are thin to a scale of a few microinches even if the parts, for example the bearing and the shaft, are each out of round to a scale of hundreds or even thousands of microinches.

A very good example of this very fine scale adjustment is shown by foil bearings, where a very flexible strip of foil, for example a strip of magnetic tape in a tape recorder or a floppy disk in a computer, is supported on an air film. The magnetic tape or floppy disk is so flexible that its local surface radius of curvature responds sensitively to equalize the surface forces upon it. In a floppy disk reader or a tape machine sliding surfaces are supported on hydrodynamic or hydrostatic films of air where the thickness of the air film may be 20 millionths of an inch or less, and the film shape adjusts so that the average variation in film thickness at any point along the bearing surface may be less than one millionth of an inch. Heavily loaded journal bearings in engines and elsewhere are similarly flexible on the scale of deflections which are relevant to hydrodynamic lubrication. Therefore, bearing performance depends on geometric scales much finer than the scale of precision to which the bearing itself can be made.

Most engine power train bearings are better thought of as foil bearings rather than as journal bearings in terms of the analysis of Sommerfeld and his successors. Foil bearings do bear loads (or neither tape recorders nor current engines would work). But foil bearings are much worse than proper journal bearings in terms of load-bearing capacity or friction if the arc angle where the bearing acts like a foil bearing is large. This is true because pressure build-up only occurs when the lubricant film is converging (being wedged together) and because the arc length over which this convergence occurs is important. Along the arc length where the oil film is sliding along parallel surfaces there is no pressure buildup (except enough to adjust for side leakage). As this arc length approaches 180°, which must occur frequently in current engine bearings, as they deform under load, bearing performance deteriorates. In this condition the bearing is acting as a foil bearing and not as a conventional journal bearing. With 180° of parallel sliding surfaces, a significant force is exerted 90° from the line of action of the load on the bearing. This internally generated force serves no useful purpose, increases friction directly, and also acts to thin the film supplied by the rotating shaft to the unloaded part of the bearing. If deformations under load are considered properly, the associated parts can be designed so that under load their relative geometry conforms to that demanded by correct journal bearing design rather than that of the poorer performing foil bearing.

Bearing performance depends on the geometries of the sliding surfaces which actually interact with the lubricant film. The Sommerfeld analysis is not mathematically wrong, but the mathematical meaning of Sommerfeld's analysis has been misinterpreted. Properly interpreted, Sommerfeld's analysis vividly illustrates how journal bearings which operate full of oil can be designed to bear loads much heavier than those of the current art. The Sommerfeld variable correlates bearing performance in terms of one dimensionless group $$S = \left(\frac{R}{c}\right)^2 \frac{\mu N}{P}$$

where R is journal radius, c (as usually interpreted) is the difference in radius of curvature between shaft and bearing in the undeformed state, $\mu$ is lubricant viscosity, N is shaft speed in revolutions per second, and P is the force per unit projected area (force divided by journal radius times journal axial length). The predictions of Sommerfeld's analysis have been carefully verified many times under experimental conditions where P was held constant at a fairly low value and the product $\mu N$ was varied. Under these conditions, where the shape of the shaft and bearing does not significantly change, experimental results fit Sommerfeld's theory closely.

It had not been properly recognized that Sommerfeld's analysis was based on geometry of the shearing oil film. What is relevant to this geometry is the match in radius of curvature of the relatively sliding surfaces which shear the oil film. The term c, properly interpreted, is the difference in radius of curvature between shaft and journal surfaces as these surfaces deform elastically in response to film pressures, not the difference in radius of curvature of these surfaces in the undeformed state as previously assumed.

The Sommerfeld equation can be broken up into two subgroups multiplied together, both of which depend on bearing load. The first subgroup, $(R/c)^2$ increases as P increases because of component deflection. A load which cuts c in half increases $(R/c)^2$ fourfold. A load which cuts c by a factor of ten increases $(R/c)^2$ a hundredfold. As c approaches zero, $(R/c)^2$ approaches infinity. When P increases, the other subgroup, $\mu N/P$, decreases. The product of the two subgroups $$S = \left(\frac{R}{c}\right)^2 \frac{\mu N}{P}$$

changes much more slowly than had previously been understood because of the deflection effect on c.

To test the analysis and the effect of increasing load on c, the inventor and his associates constructed a test bearing consisting of two near 180° arc bearings each with a cylindrical half hole 2.27" in diameter. Axial length of the bearing was 1.250". These arcs were in steel blocks 5" deep along the line of load, and were hydraulically loaded together squeezing a journal shaft of 0.005" diameter less than bearing arc diameter. The blocks were supported in a bearing test fixture, and bending was very much smaller than in any engine connecting rod or main bearing. Neither the shaft nor the bearing was constructed with particularly good surface finish or precision for this test. In order to push the film stability of the bearing, tests were conducted at the low speed of 250 RPM with a relatively low viscosity oil (10W).

The conventional wisdom is that a Sommerfeld variable value less than 0.01 is marginal and an S=0.001 is dangerous, with c taken as a constant in the calculation of S. Our test bearing operated with an S value (on this conventionally calculated basis) of approximately 0.0002. It performed extremely well with low friction at 19,000 lbs squeezing force on the shaft. Additional tests have been run with bearing-to-journal surface curvatures which would give a traditional Sommerfeld variable as low as 0.00005. In all tests the load-bearing capacity was much higher than traditional analysis would have predicted and friction coefficients were typically below 0.003.

Tests prove that the invention has sufficient load capacity for any engine application which can be reasonably imagined so long as the bearing operates full of oil. It has been established by these tests that bearing and journal relative geometry under load is the primary factor affecting journal bearing performance. Furthermore, the tests have proven that the designed-in geometry varies as a function of bearing load when the bearing deforms elastically in bending, tension and Hertzian contact.

Lubricant Control

The geometric relationship between the sliding surfaces establishes the strength, stability and thickness of the load-bearing oil film for a given lubricant viscosity and journal rotational velocity, assuming a uniform, noncompressible (fully liquid) lubricant. However, this assumption can be a poor one, and analyses of performance based on it can be radically incorrect if the lubricant contains any significant concentration of bubbles, even tiny ones. When oil pressures are lower than atmospheric (as they will be in divergent sections of the bearing geometry) vapor in the oil comes out of solution to form tiny bubbles. This phenomenon is called cavitation. A journal bearing operating without cavitation will have no load-bearing capacity. All practical journal bearings have cavitation in them providing a source of bubbles. But until these bubbles are re-absorbed by the liquid lubricant, pressure build-up in the oil film will be extremely limited, and the hydrodynamic or squeeze film pressures realized may be much lower than those predicted without considering the bubbles. The manner in which these bubbles form and are re-absorbed in the bearing is quite important. It is a purpose of the present invention to produce a more effective bubble re-absorption mechanism in engine bearings to improve performance.

The current invention uses large differences between the radii of curvature of the bearing and journal surfaces to promote the correct geometric relationship when the bearing is loaded and to assist with control of cavitation on the unloaded side of the bearing. These increased radial clearances reduce resistance to oil flow. Without a means to restrict oil flow there would be a loss of oil pressure which is undesirable. Furthermore, there would be excessive leakage of oil out of the interface between sliding parts. This would reduce load capacity. The present invention includes a means to restrict oil flow through the bearings and therefore avoids the problems mentioned above. The restriction also assures the existence of a "near full" condition with regard to oil supply within the circumferential clearance between journal and bearing surfaces.

Deformations of the bearing and journal surfaces increase with increased load. A crowning of either the journal or bearing surface in the axial direction is necessary as deformations become large. Even with correct part design if loads continue to increase there will be a point, under steady state load conditions, at which the bearing will function as a foil bearing in the deleterious manner described previously. However, in engine bearings and other bearings subject to fluctuating and reversing loads, dynamic effects due to squeeze film fluid mechanics permit extraordinarily high load-bearing capacity and thicker/lower-friction oil films under conditions of dynamic loading if the bearing operates full of oil rather than empty.

Effects of Load Reversal: Squeeze Film Effects and Oil Pumping

It should be emphasized that steady state loading is an extremely severe test of the load capacity of a bearing in reciprocating machinery (so long as it is assumed that the clearance between journal and bearing is full or nearly full of oil) because the squeeze film effects which strongly reinforce and thicken oil films with bubble-free oil are absent under steady state loading. Engine bearings regularly fail under steady state loads much lower than they withstand in engines. In an engine, bearing loads reverse every revolution, and the peak loads occur for only short times. For example, in an automobile or diesel engine operating under heavy loads, peak combustion pressures are more than twice peak compression pressures, but they fall below peak compression pressures in less than 90° of crankshaft rotation. At 500 RPM, 90° of crankshaft rotation takes 30 milliseconds. This duration is inversely proportional to engine speed. For these short periods squeeze films are very important if the loaded bearing arcs are operated with essentially bubble-free lubricant. The mathematics of squeeze film effects for many practical cases has been well worked out by Professor Dudley D. Fuller, Frank Archibald, Donald F. Hays and others. A concise explanation of the squeeze film effect is provided on page 174 of Fuller, op cit.

"Many types of machines produce pulsating or reciprocating loads on bearings and bearing surfaces on which, because of high pressures and lack of continuous sliding or turning motion, oil film breakdown and relatively severe wear are to be expected. Strangely enough this wear does not always appear. Crossheads, piston-pin type bearings, cams, tappets, and knuckle-joint bearings may show remarkable freedom from metal-to-metal contact. Apparently, when conditions are favorable, an oil film is maintained between the contacting surfaces even though the relative motion of these surfaces becomes momentarily zero.

This load-carrying phenomenon arises from the fact that a viscous lubricant cannot be instantaneously squeezed out from between two surfaces that are approaching each other. It takes time for these surfaces to meet and during that interval, because of the lubricant's resistance to extrusion, a pressure is built up and the load is actually supported by the oil film. If load is applied for a short enough period, it may happen that the two surfaces will not meet at all.

When the load is relieved or becomes reversed, the oil film often can recover its thickness in time for the next application, if the bearing has been designed to permit and assist this build-up. Indiscriminate location of oil holes, oil grooves, and reliefs may interfere with the restoration of the oil film and destroy the major part of its load-carrying capacity."

The magnitude of the squeeze film effect varies greatly with changes in the geometry of the approaching surfaces. The geometric effects are exactly calculable for simple cases (and always calculable using the calculus if geometry and viscosity are known). A sense of the critical nature of the squeeze film effect can be gotten by looking at the equations for the squeeze film effect for planar surfaces. For planar surfaces approaching each other, the formulas for resistance force W and time to collapse a set distance under a set load $\Delta t$ have the general formulas:

$$W = \left(\frac{k_1 \mu D^4}{h^3}\right) \frac{dh}{dt} \text{ and } \Delta t = \frac{k_2 \mu D^4}{W}\left(\frac{1}{(h_2)^2} - \frac{1}{(h_1)^2}\right)$$

(where $\mu$ is viscosity; W is resisting force; $\Delta t$ is time to collapse the film from film thickness $h_2$ to $h_1$; $k_1$ and $k_2$ are geometric coefficients; h is film thickness; $h_2$ is film thickness at $t_2$; $h_1$ is film thickness at $t_1$; and D is a characteristic dimension of scale applicable to a given shape i.e., circle, square, 2:1 rectangle, equilateral triangle, etc.).

The above equations are extremely nonlinear. The resisting force produced by the squeeze film as the parallel plates approach is inversely proportional to the cube of the oil film thickness. This means that a tenfold reduction in the oil film thickness produces a thousand-fold increase in the resistance to approach of the two parallel surfaces for a set approach velocity. The strength of the squeeze film is also very nonlinear with respect to the characteristic scale dimension of the parallel surfaces. A factor of two increase in scale dimension (a factor of two in radius or a factor of two in the side length of the square) quadruples area but multiplies force W by a factor of sixteen.

Squeeze film fluid mechanics is not limited to planar surfaces. The effect on curved surfaces where the radius of surface curvature is more than twenty times lubricant film thickness and lubricant film thickness is essentially constant (as will happen in the "foil bearing" portion of bearing arcs) is within 1% of the squeeze film effect which would be predicted for planar surfaces.

Calculation indicates that, assuming the oil film is relatively thick and bubble-free prior to the application of load, squeeze film effects will increase safe bearing load capacity in engines for a properly designed bearing by a factor from three to ten for constant viscosity oils. An appreciation of the important contribution squeeze film makes to film thickness can be gotten by using formula 33 of Chapter 7 of the *Standard Handbook of Lubrication* op. cit. and comparing the result with film thickness predicted under steady state conditions using formula 29 of Chapter 3 of the same reference. For a 2" diameter journal bearing of 1" axial length operated so the effective difference in radius of curvature under the load is 0.0005", the minimum oil film thickness between journal shaft and bearing for a viscosity of $10^{-6}$ Reyns at 5000 lbs steady load at 600 RPM will be $5 \times 10^{-5}$ inch (fifty millionths of an inch). If the same bearing (for the purpose of this example having an unaltered radial clearance) is operated at the same 600 RPM speed at 200 lbs load, minimum film thickness would be about $10^{-4}$ inch (one hundred millionth of an inch). If this bearing were instantaneously loaded to 31,000 lbs load, it would deflect as a film bearing over a 2" arc length (this assumption will underestimate the importance of the squeeze film effect). On the basis of this assumption it will take 30 milliseconds for the minimum oil film thickness to be reduced to 50 microinches, the steady state film thickness for a 5000 lb load. Thirty milliseconds is 108° of crankshaft rotation at 600 RPM and would be 216° of rotation at 1200 RPM. A sixfold increase in bearing load capacity dynamically compared to steady state load capacity is therefore very reasonable. The squeeze film effect, ignoring the effect of pressure on viscosity, greatly increases the maximum loads the bearing can take under the fluctuating load situation in an engine or in other reciprocating machinery. The magnitude of this squeeze film effect will vary depending on precise details about structural geometries, material stiffnesses, and oil filtration, but over the scales and geometries relevant to internal combustion engines, the effect is generally more than a factor of three and can be more than a factor of ten even ignoring the effect of pressure on viscosity. The pressure effect on viscosity further increases safe bearing load capacity for a bearing with journal/bearing clearance volume full, or nearly full, of lubricant.

The above discussion understates the load capacity provided by squeeze film effects if the bearing is full or nearly full of oil. Pressure increases oil viscosity in an approximately exponential way which can be approximated by the relation $$\mu P = \mu_o \times e^{\beta P}$$

where $\mu P$ is viscosity as a function of pressure; $\mu_o$ is viscosity at atmospheric pressure; e is the base of the natural logarithms (2.71828); $\beta$ is a pressure coefficient for a particular lubricant; and P is pressure (see Fuller, op. cit. p. 51). Depending on the lubricant, $\mu P$ may be 2-7 times $\mu_o$ at 10,000 psi pressure, and the increase in viscosity becomes yet more important at higher pressures. The increase of viscosity with pressure increases the load capacity of both steady state and dynamically loaded bearings. This is valuable since the load capacity of either a hydrodynamic or squeeze film is proportional to viscosity.

It seems intuitively obvious that the increase in oil viscosity with increasing pressure will increase the coefficient of friction (force resisting sliding divided by bearing load force perpendicular to sliding). To the inventor's initial surprise this does not appear to happen under steady state conditions. The inventor's test bearing has operated at loads which have produced oil film pressures approaching 15,000 psi. Under these conditions oil viscosity can be expected to increase by at least a factor of five, and perhaps much more. However, until the test bearing was loaded to a point where boundary surface contact due to surface geometry imperfections (large scale waviness) occurred, coefficient of friction decreased slowly but steadily with increasing loads. The explanation can be seen by careful analysis of equations 29 and 33 of Chapter 3 of the *Standard Handbook of Lubrication*, op. cit., combined with elastic theory. The low coefficient of friction of the bearings of the present invention (typically less than 0.002) under heavy steady state load conditions is almost independent of pressure-generated viscosity. Because squeeze film effects thicken oil films significantly under dynamic conditions, the bearing should have significantly lower friction loads under fluctuating load conditions than would be predicted for corresponding steady state conditions.

When a bearing subject to reversing loads is designed with proper clearances so that it functions as a true journal bearing under load and operates with the bearing/journal clearance volume full or nearly full of oil so that it supplies its unloaded side with an oil film which is nearly bubble-free in the to-be-loaded arc and relatively thick prior to load reversal, load capacity with full films will be enormous and friction will be low.

With reasonable engineering care, engine powertrain bearings of the type described herein, can be built with such high load capacity that they never again present a significant limitation to engine design. Bearing load capacities safely in excess of 10,000 lbs/in$^2$ of bearing area (about the maximum that can reasonably be expected to be needed in a spark-fired engine) can be readily obtained in powertrain bearings of the size range used in spark-fired engines. With somewhat more care, bearing load capacity safely in excess of 20,000 lbs/in$^2$ of bearing area (about the maximum that can reasonably be expected to be used in diesel engines) can be obtained for diesel powertrain bearings. The limit of full film function with journal bearings designed according to the current invention is not yet known. In dynamically loaded applications such as crankshaft-driven forging presses, bearing load-capacities above 100,000 psi without any surface contact between journal shaft and bearings are possible. It may be true that these bearings, with proper care applied to geometric details, surface finish, lubricant selection, and oil filtration can always be made to bear loads heavier than can be supported by the structure which can be put around them. This constitutes a major advance in the sphere of the possible in engine and other machine design, where bearings have very often been limiting.

Keeping the Bearing/Journal Clearance Full of Oil

From what has previously been said about squeeze films, it may seem surprising that prior art journal bearings ever operate with actual surface contact between bearing and journal. However, they do and boundary lubrication issues have been a continuous problem in prior art journal bearings. The reason is that squeeze film forces of significant magnitude only occur when it is oil, not air bubbles or gaps between oil films, which separates the sliding surfaces. Squeeze film effects in prior art bearings have had a perverse result. They strongly act to pump oil out from between the sliding surfaces of the journal and bearing. This causes undesirable voids which greatly reduce the film strength of the bearing. The phenomenon of cavitation void collapse produces shock loading problems which cause both noise and bearing material fatigue. Consider a bearing of diameter D with an axial length l and a diametral clearance 2c for a common cylindrical bearing. On each load reversal, the journal shaft position moves parallel to the tension/compression direction of main loading by a significant fraction x (usually more than 90%) of distance 2c. This motion displaces a volume v of shaft projected area times displacement.

$$v = 2 \times cDl$$

If the bearing clearance in the direction of shaft motion with load reversal is initially full of oil, a volume generally larger than 0.6 v for the D/c ratios common to auto engines will be swept out of the bearing per load reversal. This is generally more than 70% of the volume of the clearance in the bearing. A void of similar volume (0.6 v) is created on the newly unloaded side of the bearing. Loads reverse on connecting rods at least once per revolution, oil holes are generally not arranged to effectively fill this space, and the result is that bearing clearances are largely filled with air pockets or voids. Moreover, the high loadings characteristic of the bearings produce strong side flows of oil due to hydrodynamic action as can be seen in FIG. 53, Chapter 5–43 of the *Standard Handbook of Lubrication Engineering*, op. cit. Under conditions of loading characteristic of engine bearings, 60–90% of the oil flowing into the loaded arc of the bearing will leak out of the bearing axially and will not recirculate to the unloaded (to-be-loaded) part of the bearing. For both dynamic squeeze film and steady load hydrodynamic reasons, therefore, the clearance volume between journal and bearing in current practice bearings is largely filled with compressible, low viscosity air, rather than the lubricant which is required for proper bearing function. The presence of this empty or air-filled space is highly deleterious to function from both a hydrodynamic and squeeze film point of view.

Many of the problems with prior art bearings are traceable to these voids. The voids do not produce significant resistance to journal motion and when the voids are filled abruptly, shock loads perceptible as noise may result. The voids are not uniform; with load reversal, pockets of pressurized air may be created which act to nearly eliminate oil films on bearing and journal surfaces and permit conditions of boundary lubrication or film breakdown. Film breakdown increases friction and causes wear problems. An additional problem caused by the voids is that, when load is reapplied to the portion of the bearing containing them, they collapse by absorption into the suddenly pressurized oil in a manner known as "cavitation void collapse." This produces instantaneous concentrated forces high enough to cause local bearing damage. In addition to these deleterious effects, operating the bearing clearance in a less than full condition always reduces lubricant film thicknesses and produces a friction penalty even with totally full film lubrication. For these reasons, it is highly desirable to design the bearing so that it operates as near to full of lubricant as possible.

Once it is recognized that the clearance between journal and bearing is largely empty, it is possible to solve the oil void problem by restricting axial leakage from the journal/bearing clearance (which may be achieved with an O-ring arrangement or with relatively tight clearances along the bearing ends) combined with flow passage geometry so that the path of least resistance for oil pumped out of the oil film by either hydrodynamic or squeeze film action is circumferentially around the bearing clearance to fill up the unloaded and otherwise empty clearance volume rather than to leak axially from the bearing. When this is done, the amount of flow into and out of the bearing need only be enough to remove heat generated in friction, which means significantly less oil flow is required to the bearing than is currently supplied.

To the extent that the oil clearance in the bearing can operate pressurized, by providing sufficient axial restriction so that pump pressure is maintained in the active bearing clearances, an effective and useful mechanism for causing cavitation bubbles to be reabsorbed in the oil prior to entering a loaded portion of the oil film will exist. Moreover, for the large radius of curvature clearances required to make the journal/bearing geometry proper under load, it is typically necessary and highly desirable to have at least two bearing arcs with significantly different centers of curvature restricting the motion of the bearing with respect to the journal along the line of action of tensile or compressive loading. When this is done, the "unloaded" portion of the bearing will generate small but significant hydrodynamic pressures which will serve to crush and cause readsorption of cavitation bubbles. Therefore, upon load reversal the oil entering the loaded section will be nearly bubble-free.

When journal bearings are designed so that proper journal/bearing geometry is achieved in the loaded condition, and care is taken to maintain a nearly full oil film in all radial clearance sections, they can be expected to function at much higher loads with lower friction than current practice bearings.

The foregoing and additional objects and advantages of this invention are further disclosed in the following detailed description and drawings, showing a preferred embodiment of this invention.

IN THE DRAWINGS

FIG. 1a is a schematic sketch of the test fixture which demonstrated the very high load-bearing capacity of bearings where clearances between journal shaft and bearing were built with proper consideration of elastic deflections.

FIG. 1b, to illustrate the importance of deformations, shows the "Hertzian contact area width b" which is calculated to occur with Hertzian deformation (no bending) for a 10,000 lbf loading on a 1″×2.27″ bearing.

FIG. 4 illustrates the action of the circumferential recirculation grooves in providing a path of least resistance whereby oil squeezed axially out of the active bearing section by hydrodynamic or squeeze film action recirculates to the unloaded (soon-to-be-loaded) clearance portion of the bearing, which would otherwise be largely empty of lubricant, rather than being lost axially from the bearing.

Figure 5:
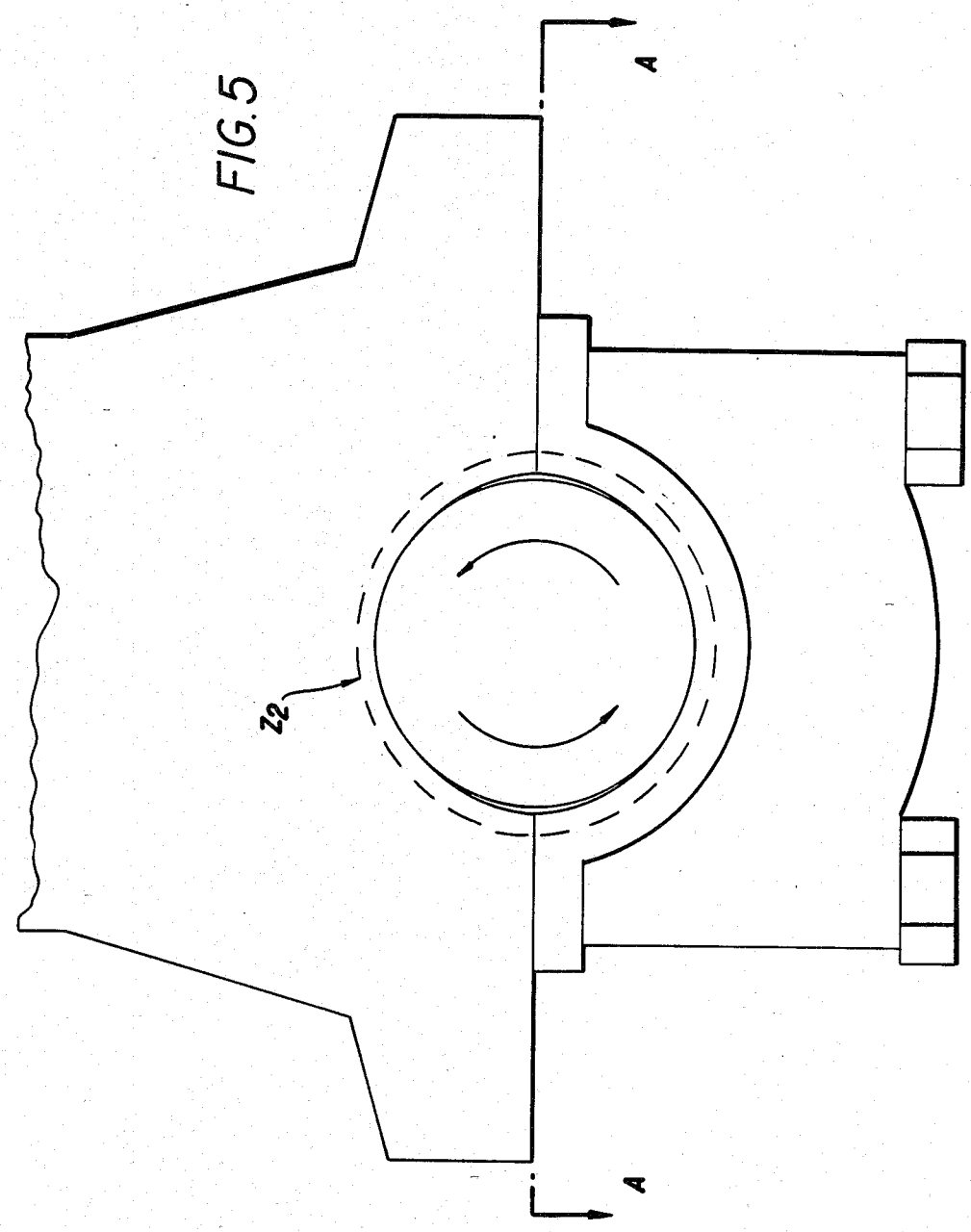

FIG. 5 illustrates an engine main bearing arrangement with half the bearing arc in the engine block and half in a relatively stiff main bearing cap. This is nearly analogous in effective stiffness to the rig of FIGS. 1a and 1b. End leakage restriction and circumferential oil recirculation means like those shown FIGS. 3a, 3b, 3c, and 4 are employed and these figures can be said to correspond to FIG. 5 on view A—A.

Figure 6A:
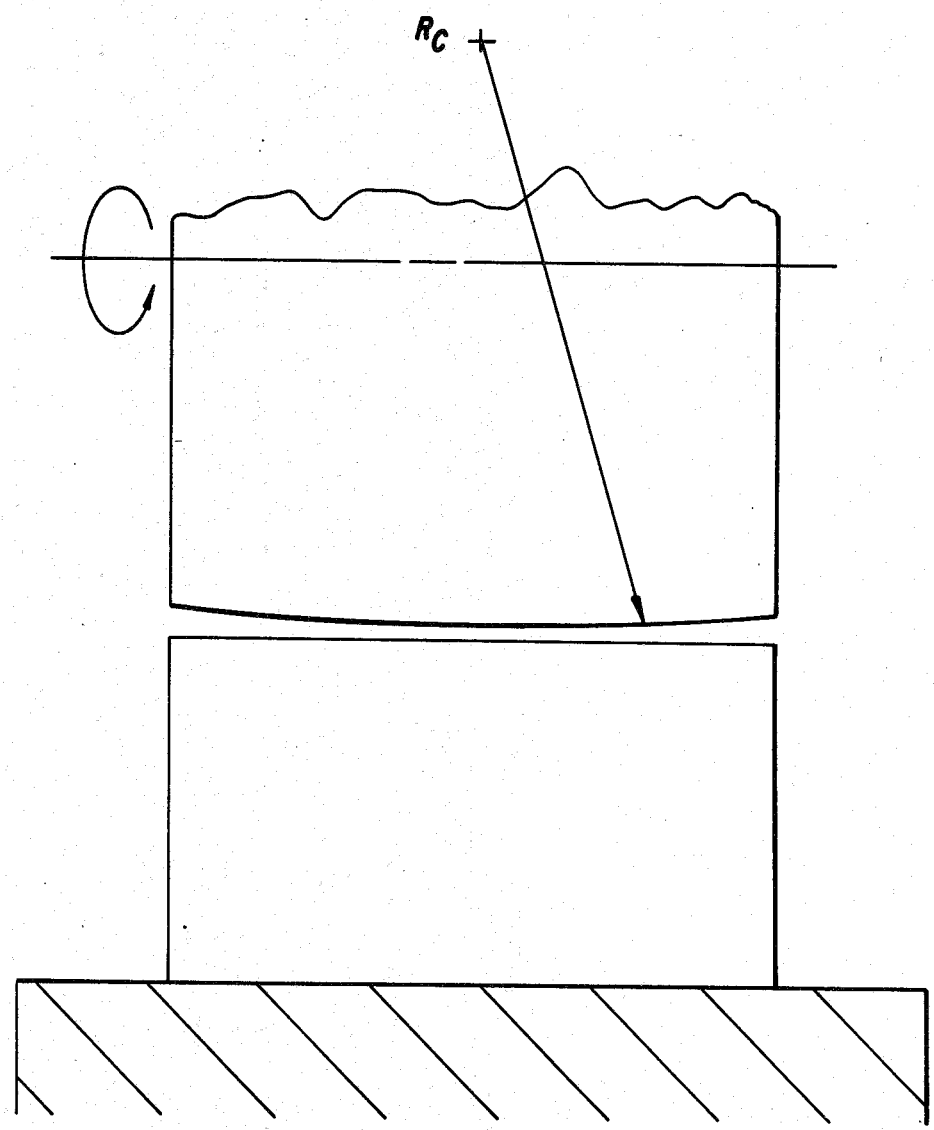

FIG. 6a illustrates "axial crowning" of a journal shaft with respect to a bearing.

Figure 6B:
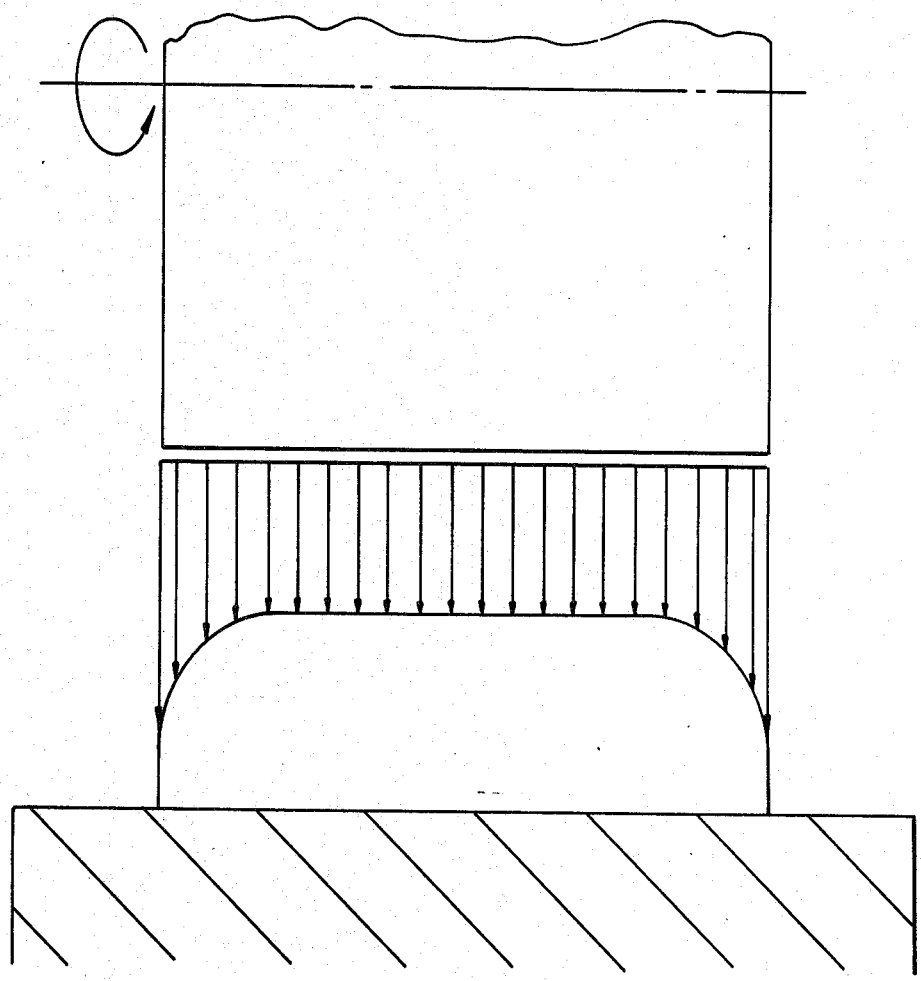

FIG. 6b illustrates the axial Hertzian stresses which occur without axial crowning.

Figure 6C:
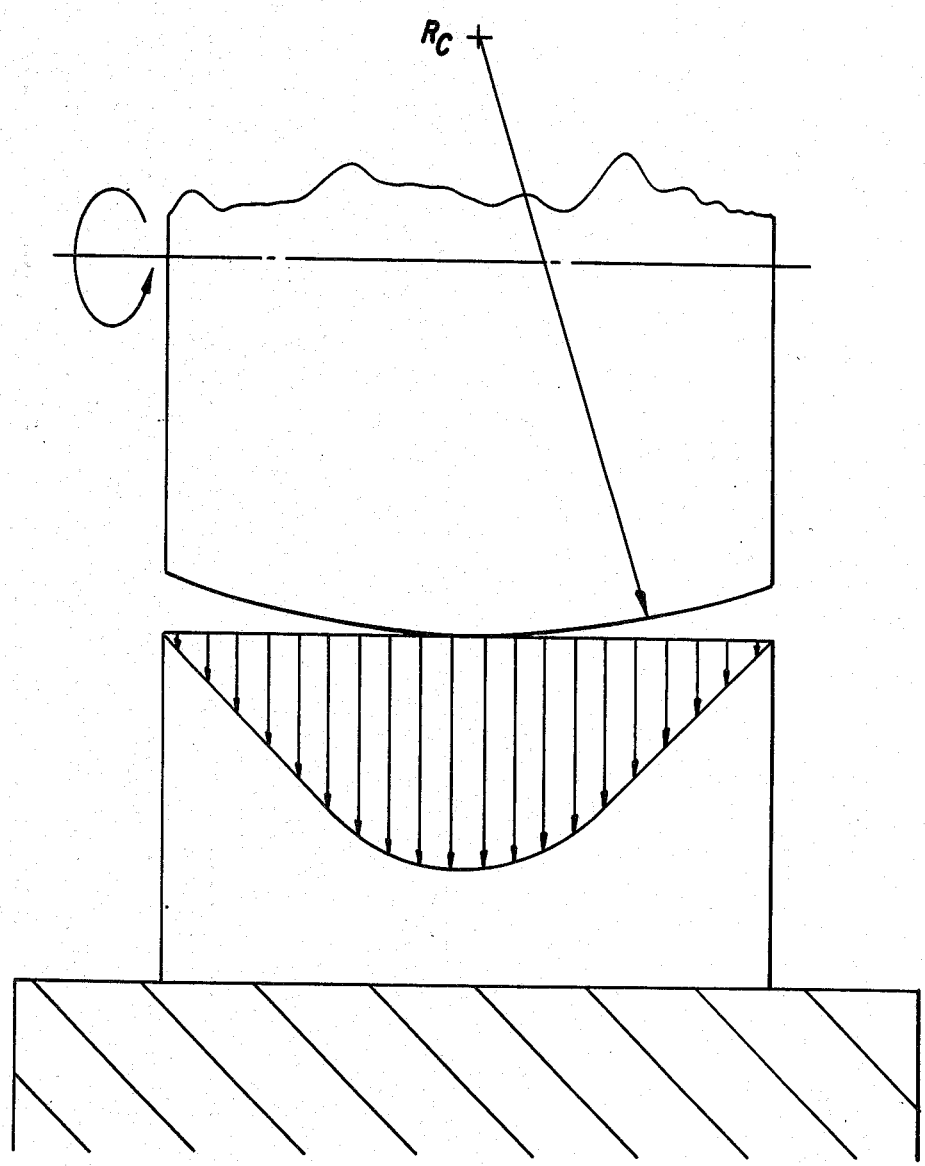

FIG. 6c illustrates the Hertzian stresses which occur with axial crowning of the journal shaft with respect to the bearing.

Figure 2:
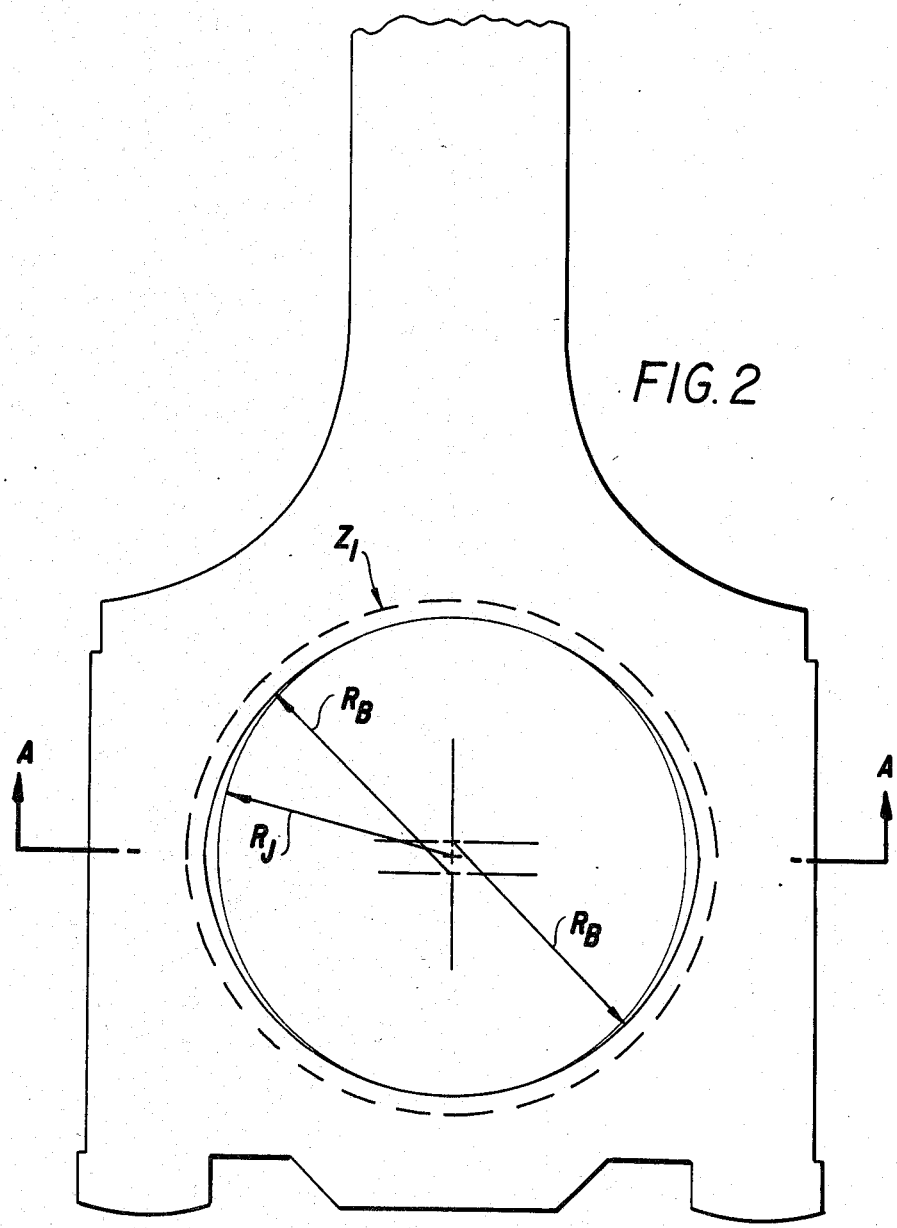
FIG. 2 is a central sectional view of a connecting rod perpendicular to the crankshaft journal axis showing geometry analogous to that of FIGS. 1a and 1b. The dashed line illustrates the alternatives of a bearing insert or a bearing constructed integrally with the connecting rod.
Figure 3A:
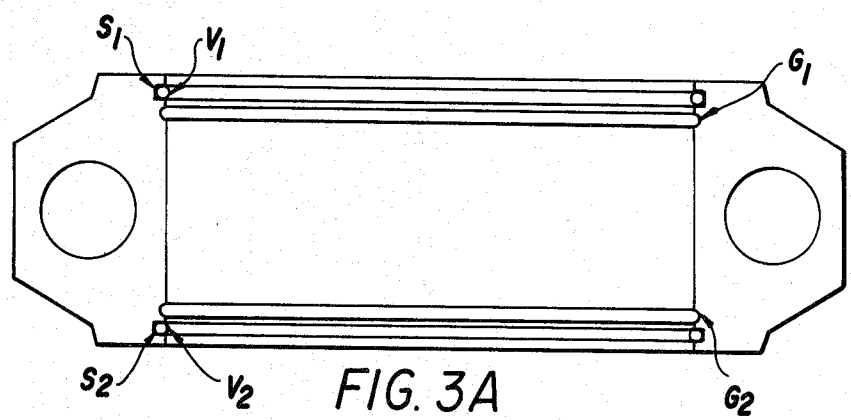
FIG. 3a is a view on A—A of FIG. 2 showing O-ring end sealing means and circumferential flow recirculation groove means on both axial ends of the bearing. These seals and grooves maintain a nearly full clearance volume between shaft journal and bearing during operation for a bearing formed integrally with the connecting rod.
Figure 3B:
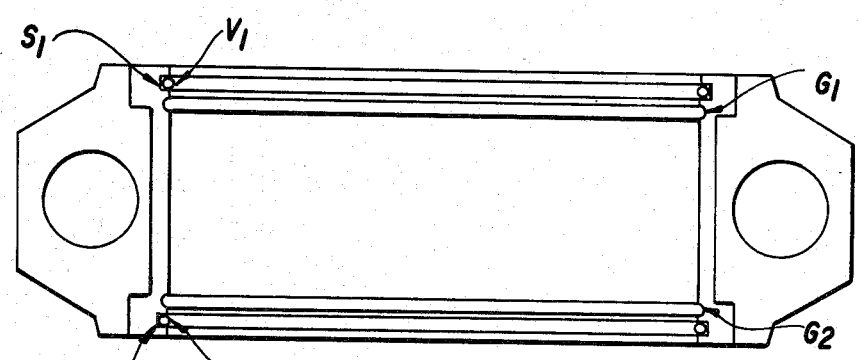
FIG. 3b is analogous to FIG. 3a, but shows a bearing insert rather than integral construction.
Figure 3C:
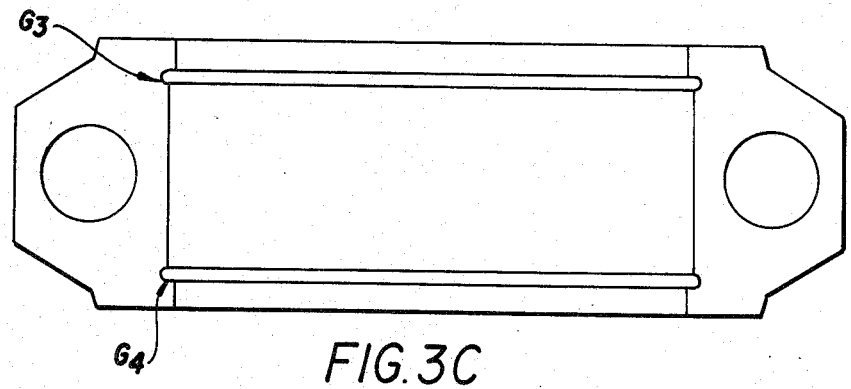
FIG. 3c is analogous to FIGS. 3a and 3b except that a tight axial end clearance of the bearing against the crankshaft restricts oil leakage from the bearing rather than an O-ring. Circumferential oil recirculation grooves function analogously to those illustrated in FIGS. 3a and 3b.
Figure 7:
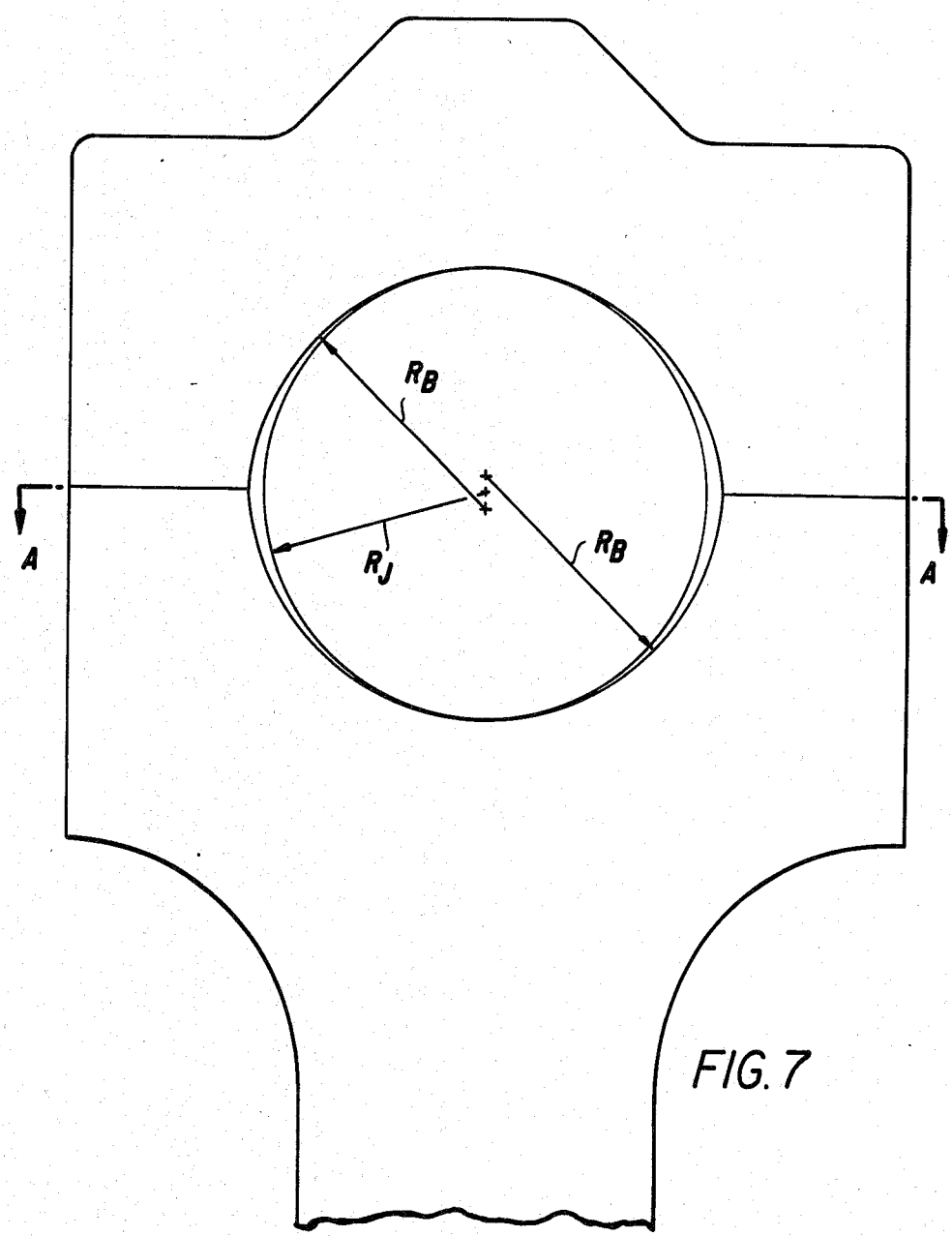

FIG. 7 is analogous to the connecting rod of FIG. 2 but shows the bearing of the present invention applied in a very heavy load and possibly large application such as a forging press. FIGS. 3a, 3b, 3c apply to FIG. 7 as well as to FIG. 2.

Figure 8:
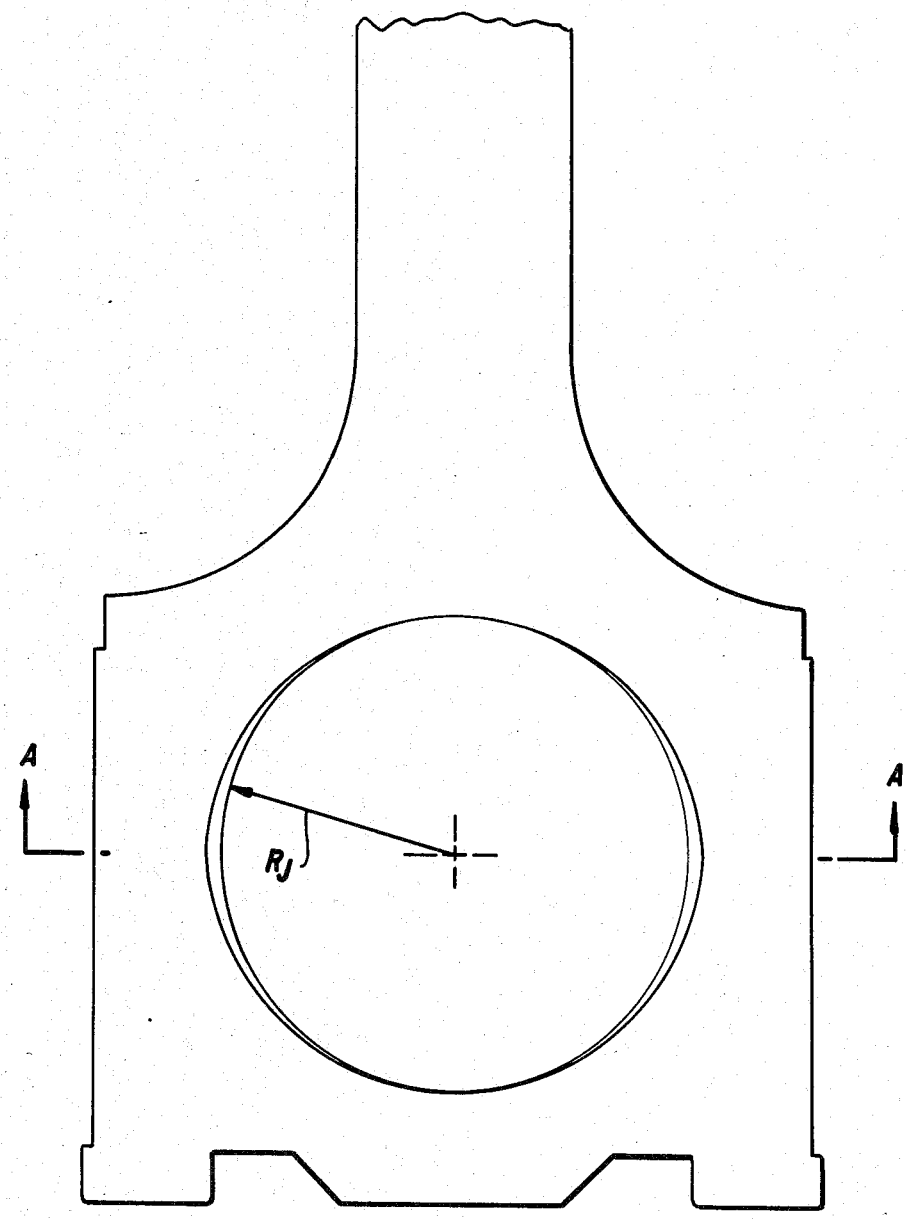

FIG. 8 is analogous to FIG. 2 but shows a bearing which is elliptical rather than composed of two circular arcs with offset centers of radii. The elliptical shape may be formed by machining the bearing in a distorted condition caused by compression along the bearing parting line.

DETAILED DISCUSSION

Figure 1A:
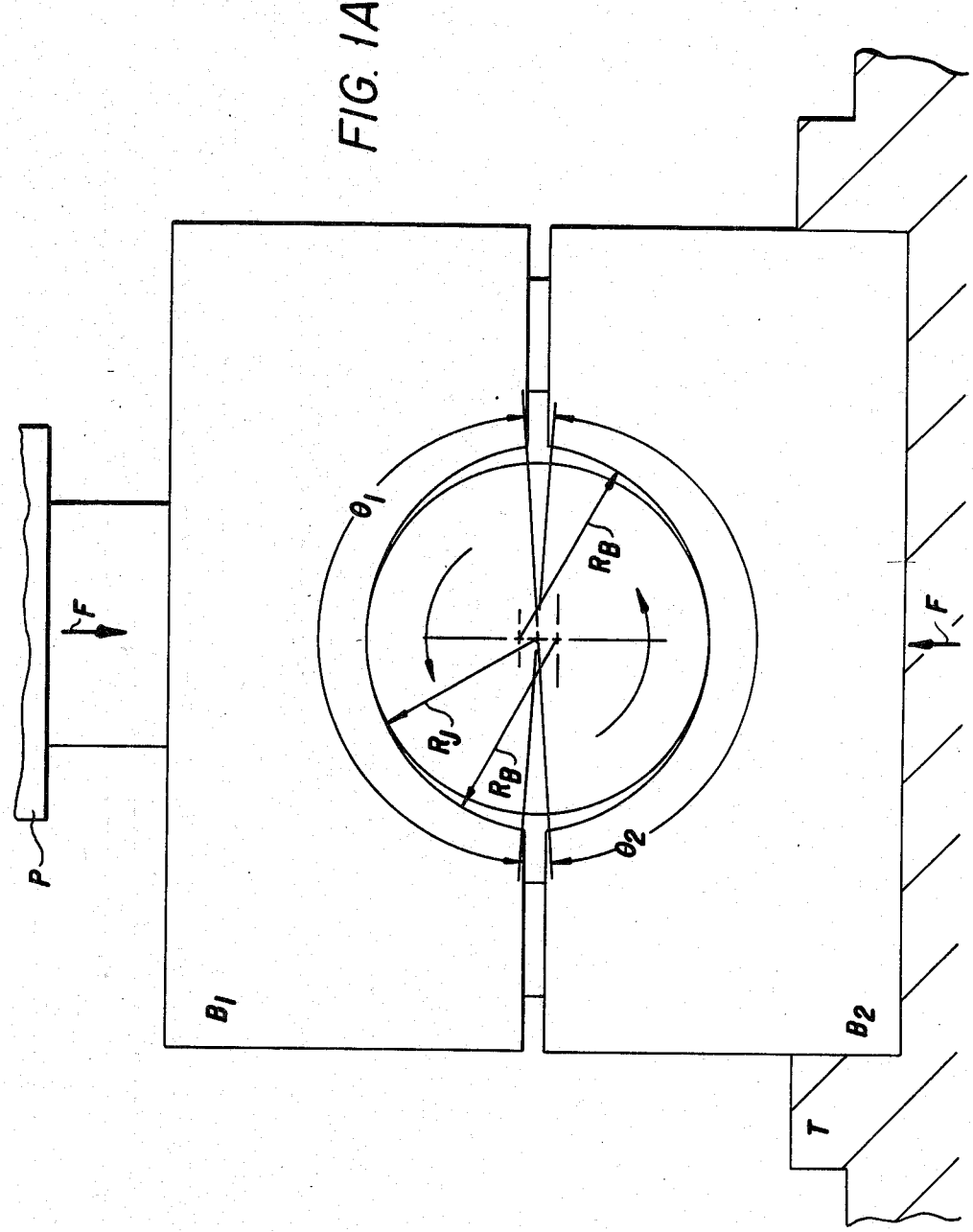
FIG. 1c shows data from the set-up illustrated in FIGS. 1a and 1b for a shaft bearing radius of curvature in the undeformed state of 0.0062″.
Figure 1B:
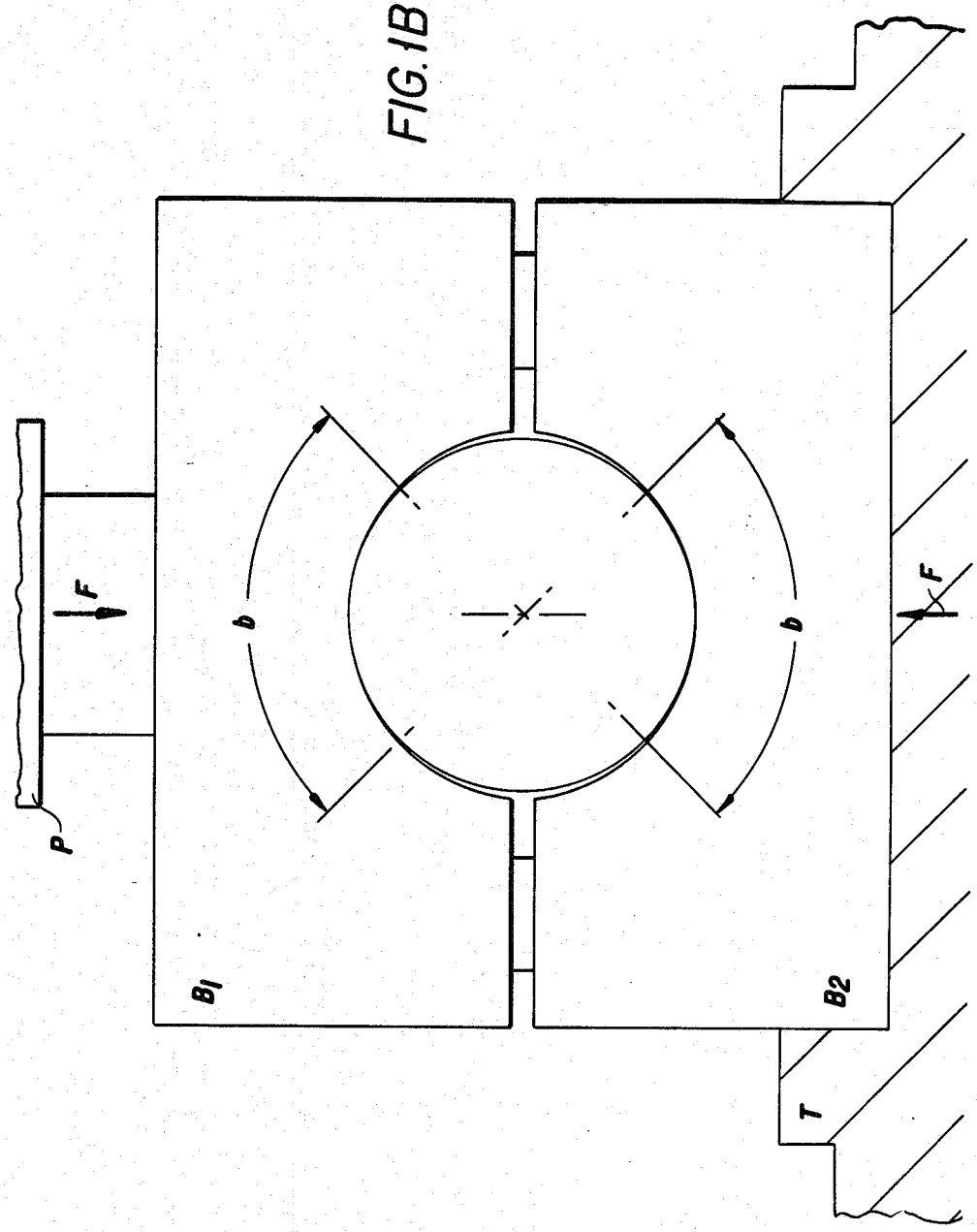

FIGS. 1a and 1b illustrate the test bearing which demonstrated the very high load-bearing capacity of bearings designed with clearances between journal shaft and bearing which give proper consideration to elastic deflections, as described previously in the Background section. Two nearly 180° arcs $\theta_1$ and $\theta_2$ were bored in large steel blocks $B_1$ and $B_2$, and placed between a table T and a hydraulic piston loading rig P so that a shaft placed between them was loaded by forces, F, equally placed against both halves of the split bearing. The test fixture could produce squeezing loads as large as 20,000 lbs. The radius of curvature of the 180° arcs $\theta_1$ and $\theta_2$ was $r_b$, as illustrated in FIG. 1a. $R_j$, the radius of the shaft, was significantly (0.005) less than the radius $r_b$. The two steel blocks $B_1$ and $B_2$ were loaded by a hydraulic piston P pressing on the top of block $B_1$ against block $B_2$ which was mounted on a relatively rigid table T. Oil supply holes were located at points near the horizontal separating line between blocks $B_1$ and $B_2$. They were located at the point of maximum radial clearance between shaft and bearing, and supply oil to the in-running nip for each bearing section as long as rotation is in the counterclockwise direction. The journal was rotated counterclockwise with an electric motor equipped with a torque sensor, and the load f on the bearing, read on a pressure gauge, was determined by reading pressure on a known area hydraulic piston P. With this test rig we were able to illustrate the congruence between elastic deflection and hydrodynamic pressure development, and experiment to illustrate the extreme load capacity possible with hydrodynamic journal bearings under steady state load condition when elastic deflections were properly brought into account.

FIG. 1b illustrates the contact arc for a non-rotating bearing, where the Hertzian deformations produced an identical radius of curvature within the arc between the shaft journal and the bearing. For a clearance of 0.005" and a loading of 10,000 lb force, the arc illustrated as b has identical radii for both shaft and bearing. Under conditions of rotation, there will be a full hydrodynamic film within this arc and the radius of curvature between journal and bearing will not be exactly matched, but the bearing will illustrate very large load-bearing capacity because of the R/c term in the Sommerfeld variable previously discussed.

FIG. 1c shows data for the setup of FIGS. 1a and 1b for a shaft-bearing radius of curvature difference in the undeformed state of 0.0062". The relatively low friction shown at loads producing contact arcs such as that illustrated in arc b of FIG. 1b is notable, particularly for the test runs using 10 weight oil. Under the fluctuating load conditions characteristic of engine operation, where squeeze film effects are important, coefficients of friction lower than those shown are expected to occur. Load capacity of this bearing is believed to be limited by structural limitations in the experimental load fixture used to test it. Therefore the maximum steady-state load capacity of this bearing is not known.

FIG. 2 is a central view of a connecting rod perpendicular to the crankshaft journal axis showing geometry analogous to that of FIGS. 1a and 1b. The dashed line illustrates the alternative of a bearing insert, the solid line (illustrated in FIG. 3b) represents a bearing constructed integrally with the connecting rod. The relationships between bearing radii denoted by $r_b$ and journal radius denoted by $r_j$ are analogous to those illustrated in FIG. 1a. An oil supply hole (not shown) provides oil through the journal to the bearing under pressure which may be maintained with axial leakage restrictions illustrated in FIGS. 3a-3c. One skilled in the structural arts can tell by inspection that the connecting rod of FIG. 2, particularly considering the geometry variation in the axial direction not shown in this sectional view, will be very much less stiff than that illustrated in the rig of FIGS. 1a and 1b because there will be significant bending deformation in the plane perpendicular to the journal axis in addition to the unavoidable Hertzian deformation. This additional structural flexibility makes provision of clearance (radius of curvature difference) between journal shaft and bearing yet more important than it would be in the stiffer structure illustrated in FIGS. 1a and 1b. In addition, it can be seen in FIG. 2 that the journal is shown to rotate counterclockwise. And in the geometry shown (where the clearances, which are in reality very small, are not clearly shown) it can be seen that a wedge film will exist on both sides of the bearing, analogous to the oil film geometry generating opposing forces in FIG. 1. This will produce a loading on the bearing shaft due to shaft rotation which will exist regardless of whether the connecting rod illustrated in FIG. 2 is in tension due to inertial or compressive load along a line of action between the journal shaft center and the wrist pin center (not shown). The existence of a "hydrodynamic preload" intrinsic in the "elliptical bearing" structure illustrated is useful in producing oil film pressurization which acts to cause reabsorption of cavitation bubbles in the unloaded oil film prior to load reversal, for reasons discussed previously. It should be emphasized again that the actual stiffness of a connecting rod structure such as that illustrated in FIG. 2 is very much less than that illustrated in the rig of FIGS. 1a and 1b and in consequence the clearance as a ratio of $r_j$ may properly be as large as 0.010 times the journal radius $r_j$ or larger. Even with radial clearances as large as this in the undeformed state, the bearing will act very much like a foil bearing over a significant arc under loaded conditions. However, this is tolerable because of the squeeze film effects which characterize the dynamic loading of the bearing if the bearing is operated with the clearances between journal shaft and bearing nearly full of lubricant rather than empty as they currently are.

The provision of means to keep the clearance volume between journal and bearing full of lubricant is critical to proper bearing function, and three alternative geometries for this purpose, each a substitutable view on section A—A of FIG. 2, are illustrated. FIG. 3a illustrates a bearing integral with the connecting rod cap having two circumferential O-rings $V_1$ and $V_2$ in O-ring grooves $S_1$ and $S_2$. Axially inside O-rings $V_1$ and $V_2$ are oil circumferential recirculation grooves $G_1$ and $G_2$ which provide a "path of least resistance" whereby oil pumped either hydrodynamically or in squeeze film mode out of the active surface of the bearing recirculates and refills the currently unloaded arc of the bearing so that it is full of oil when the load reverses. FIG. 3b is analogous to FIG. 3a, but with the bearing designed as an insert rather than with integral construction. The geometry of FIG. 3b corresponds to the geometry which includes dashed line $Z_1$ in FIG. 2 to denote a bearing insert construction. FIG. 3c illustrates circumferential oil recirculation grooves $G_3$ and $G_4$ analogous to grooves $G_1$ and $G_2$ of FIG. 3a, but uses tightly specified restrictions in axial clearance between the bearing and its corresponding portions of the crankshaft journal ends to restrict oil flow without resort to O-rings. This design involves a small friction penalty and some tight tolerancing in exchange for eliminating the O-rings. This sealing means is compatible with either the integral or insert bearing configuration. Other sealing means also can be used.

FIG. 4 illustrates the action of the circumferential recirculation grooves in providing a path of least resistance whereby oil squeezed axially out of the active bearing by hydrodynamic or squeeze film action recirculates to the unloaded (soon-to-be-loaded) clearance portion of the bearing which would otherwise be largely empty of lubricant, rather than leaking axially from the bearing. A journal shaft J rotates counterclockwise as shown in the drawing and has a leftward force f forcing it against bearing surface B. The circumferential groove is shown by dashed line G and the direction of flow away from the minimum oil film thickness $h_c$ is illustrated in the drawing. Oil will follow the above outlined path in a bearing where the resistance to axial leakage is larger than the circumferential recirculation flow resistance of circumferential grooves such as that illustrated by G in FIG. 4 or by grooves $G_1$ and $G_2$ in FIG. 3a. Oil which would otherwise be pumped out of the bearing by actions which also create voids in the bearing oil film is instead recirculated to keep the bearing full. Although some oil flow is required through the bearing in order to adequately sweep away the heat generated by friction within the bearing, the flow required to do this is smaller than that of current engine bearings. When the dynamics of connecting rod bearings is understood, particularly the fact that at high RPM they frequently operate at several thousand g's (gravitional force equivalents) of centrifugal acceleration, it can be appreciated that the rotating action of the crankshaft can act strongly to dry out the bearing, and this can result in disastrous problems for a bearing operating with excessive clearance. The O-rings or tight axial clearance illustrated solve this problem, and also permit a bearing with the large bearing/shaft clearances desirable to operate full of oil. For optimal function and load capacity it is highly desirable to have significant radial clearance difference between the bearing and the journal. However, consideration of squeeze film effects with a full bearing indicate that, even without proper specification of bearing arcs, the provision of axial leakage restriction and circumferential recirculation means would reduce friction, improve load-bearing capacity, and extend operating life.

FIG. 5 illustrates an engine main bearing arrangement, nearly analogous in effective stiffness to the rig illustrated in FIGS. 1a and 1b, with half the bearing arc in the engine block, which is conventional, and half the bearing arc in a relatively stiff main bearing cap. End leakage restriction and circumferential oil recirculation means like those shown in FIGS. 3a, 3b, or 3c are required and the view A—A relevant to FIG. 5 can be substituted for the view A—A of FIG. 2 so that FIGS. 3a, 3b, and 3c become illustrations of view on sectional A—A of FIG. 5. Plainly, the additional stiffness of the bearing structure reduces the optimal clearance between bearing and shaft required relative to that which applies to the connecting rod of FIG. 2, which has important bending compliance. But the requirements for a relatively enlarged bearing/journal radial clearance combined with axial flow restriction and circumferential recirculation means still exist in order to establish much increased load-bearing capacity with reduced friction and greatly improved life. FIG. 5, as is the case in FIG. 2, can be considered as an example of integral bearing construction (no importance of dashed line) or of a bearing insert geometry (dashed line $Z_2$ which corresponds to line $Z_1$ in FIG. 2.) FIGS. 3a, 3b and 3c with comments previously made in reference to these Figures can be considered to be views on A—A of FIG. 5.

The prior discussion of contact or Hertzian deformations dealt with the contact deformations which occur in a shaft of "infinite extent" where end effects were not taken into consideration. Since real connecting rod or main (or any other) bearings are of finite length, end effects must be considered, and they are treated in FIGS. in 6a, 6b, and 6c. FIG. 6a illustrates a journal shaft and denotes a crown $R_c$ which, if properly chosen, eliminates end effects up to the bearing designed maximum load so that the bearing has proper geometry axially as well as with respect to radial deflections under the loads. For a two inch journal bearing of 1.5" axial length designed to operate at a peak load of 20,000 lbs/inch, a constant radius of curvature of about 1,000" producing a deflection about 0.0003" will be nearly optimal. FIG. 6b illustrates the axial Hertzian stesses which occur in a perfectly cylindrical shaft without crown. As is shown in the drawing, there are concentrations of stresses near the ends of the bearing. FIG. 6c illustrates the stresses which occur with somewhat excessive axial crowning of the journal shaft with respect to the bearing so that most of the load occurs toward the center of the bearing. The ideal stress distribution on the bearing is nearer to that shown in FIG. 6c than in FIG. 6b. Although the FIGS. 6a, 6b, and 6c above illustrate crowning of the shaft, an equal and opposite corresponding curvature in the bearing can be substituted. Moreover, for structures having elastic compliance in a range characteristic, for instance, of connecting rod bearings, the amount of crown which should be designed into the bearing must take into account the flexibility of the connecting rod in its axial direction. For a properly designed connecting rod, the elastic deflections of the connecting rod bearing could eliminate any need to crown the shaft. The proper degree of shaft positive crown or bearing negative crown for any particular bearing application is a matter of the specifics of the design. The crown geometry required may be achieved by many means including burnishing grinding, or "running in" the bearing with an oil having extreme pressure, "chemical machining" additives. Chemical machining will "weaken" the bearing/shaft interface to optimal geometric shape without seizing and will produce excellent surface finish. Using the chemical machining technique proper axial crowning has been achieved in the test rig illustrated in FIGS. 1a and 1b for very high loads. In production, of course, it is preferred to design the bearing with axial compliance so that crowning is not required or to shape the shaft, through grinding, burnishing, or otherwise, to the proper geometry so that no wear-in process is required.

The previous discussions have been focused on bearings applicable to reciprocating piston engines, but it should be appreciated that crank pin/connecting rod assemblies and other assemblies subject to large fluctuating loads are common in many machines. FIG. 7, therefore, is analogous to the connecting rod of FIG. 2, but shows the bearing of the present invention under a very heavy load in an application such as a forging press. FIGS. 3a, 3b, and 3c apply to FIG. 7, as a view on sectional A—A, as they do to the geometry of FIG. 5 or FIG. 2. Under fluctuating load applications that involve the superposition of squeeze film and hydrodynamic fluid mechanics, extremely large load-bearing capacity, which may equal or exceed the load-bearing capacity of the bearing supporting structure itself, should be possible with low friction and excellent film stability. There may prove to be no practical limit, so far as bearing oil film stability is concerned, on the load capacity which can be safely borne by such a bearing. Load capacities in excess of 100,000 lbs/square inch of projected bearing area are probably practical.

In the previous discussion of connecting rods and main bearings, the discussion has been, in effect, restricted to direct tension and compression forces with respect to the connecting rod, and other applications, in effect forces perpendicular to the bearing half parting lines. However, the designs illustrated do in fact have excellent load-bearing capacity at angles of load significantly different from this, and in fact have load-bearing capacity in a direction perpendicular to the direct tension/compression direction. This occurs because the clearance and difference in center of curvature between bearing arcs, although larger than current practice, still substantially restrain side motion of the bearing. For the 45° off-center loading which is characteristic of main bearing cap loading in V-type engines, load capacity is ample. The load capacity is also ample for bearing the side loads on a connecting rod, particularly since these side loads are proportional to rotational velocity so that they are only significant when both the hydrodynamic and squeeze film effects produce very robust oil film stability.

FIG. 8 is analogous to FIG. 2 which shows a bearing which is elliptical rather than composed of two circular arcs on different centers. The elliptical shape may be formed by machining the bearing in a distorted condition caused by compression along the bearing parting line, or (in the case of a bearing insert rather than integral construction) by machining the bearing shell in an analogously strained condition so that after spring-back the bearing is elliptical to good approximation. The previous discussion of Hertzian deformations has dealt with constant radius of curvature curves; however, the general Hertzian equations, shown in formula 4, page 513 of Roark & Young op. cit., are applicable to any curved surface and fit easily into the equation of an ellipse integrating at points of instantaneous radius of curvature which are easily calculable. It can be shown that an elliptical curve will function as well as the two circular arcs described previously and may be less expensive to manufacture in practice The need for maintaining the bearing clearance in a full condition is the same for an elliptical (or any other fine scale geometry) bearing as it is for the bearings previously discussed and FIGS. 3a, 3b, and 3c can be considered to be views on sectional A—A of FIG. 8.

Those skilled in the mathematical arts will recognize that there exist innumerable fine scale arcs which can function according to the present invention as well, or nearly as well, as the circular arc or elliptical bearings described. What is required mathematically is a bearing arc curve such that, under applied loads, the distorted geometric relationship between bearing and shaft produces smoothly convergent sections and produces a good approximation of a "foil bearing" in the loaded arc. This matching of curvatures in the "foil bearing" arc is optimal for squeeze film strength which greatly increases load-bearing capacity for dynamically loaded bearings. The mathematical requirement for permissible and useful bearing arc curves is that these curves be smooth, have radii of curvature around the circumference always within a certain range which may be evaluated directly by inspection or computation with respect to formula 4 in Roark & Young, op. cit., and that the radius of curvature variation about the bearing arc vary in a mathematically continuous manner, preferably in a manner where the second derivative of bearing radius of curvature is also smooth in any range where the oil film of the bearing will have to act to produce significant pressure under bearing loading. For any such bearing, it is important that axial leakage be restricted and circumferential recirculation flow means about the ends of the bearing be provided so that the bearing operates dynamically in a nearly full lubrication condition, rather than the nearly empty condition characteristic in current and past reciprocating journal bearing practice.

It is claimed:

1. A hydrodynamic journal bearing combination comprising:

a rotary journal shaft having a circular cross section, a journal bearing surrounding said rotary journal shaft, said journal bearing having at least two symmetrical arcuate bearing surfaces, each arcuate surface having the same radius, said radius being slightly greater than that of the rotary journal shaft, each arcuate bearing surface defining less than 180° and having a mid point intermediate it ends, the arcuate bearing surfaces being disposed with their mid points diametrically opposed, the journal shaft being positioned within the area covered by the two arcuate surfaces whereby a small clearance is maintained therebetween at all points under both load and no-load, lubricant filling the aforesiad clearance between the journal shaft and the two arcuate surfaces, whereby the areas of rotary journal shaft engagement with each arcuate bearing surface are equal to provide general force equilibrium in the journal bearing combination regardless of load or speed or rotation, and whereby the difference between radii of the said arcuate bearing surfaces and said rotary journal shaft radius, considering the load-deflection characteristic of said journal bearing and said shaft, is sufficiently great that the change of radius of curvature of said bearing surfaces and said shaft under load still provides a complete lubricant film over an area of at least 120° for each arcuate surface under the mean loading of said bearing combination.

2. The invention as set forth in claim 1 and wherein means are provided for retaining the lubricant in operative location within the clearance formed by the rotary journal shaft and the surrounding journal bearing during fluctuating and reversing loading of said bearing, said means comprising sealing means near each end of said bearing and circumferential groove means inside said sealing means near each end whereby the path of least resistance of lubricant forced out between the approaching loaded surfaces of said journal shaft and the loaded arcuate journal surface is circumferential, whereby the lubricant acts to fill the unloaded clearance between an arcuate surface and a journal surface which is unloaded rather than escapes from operative location within the cavity.

3. The invention as set forth in claim 2 and wherein the means provided for retaining the lubricant in operative location comprises at least one "O" ring on each side of the journal bearing to seal off flow from between the rotary journal shaft and surrounding journal bearing.

4. The invention as set forth in claim 2 and wherein the journal bearing surrounding the rotary journal shaft is divided horizontally into two equi-shaped bearings.

5. The invention as set forth in claim 4 and wherein sealing means are provided to limit escape of lubricant from between the rotary journal shaft and the journal bearing surrounding said shaft.

6. The invention as set forth in claim 2 and wherein the rotary journal shaft is the crank shaft of an internal combustion engine and the journal bearing surrounding said shaft is a connecting rod bearing on the end of a connecting rod.

7. The invention as set forth in claim 6 and wherein the connecting rod bearing is horizontally divided into two equi-shaped bearings.

8. The invention as set forth in claim 7 and wherein both portions of the two equi-shaped bearings are provided with "O" rings adjacent both outside edge portion to limit escape of lubrication.

* * * * *